Dec. 14, 1954 K. M. BROWN 2,697,064
DESULFURIZATION AND REFORMING OF HYDROCARBON FRACTIONS
Filed July 13, 1953
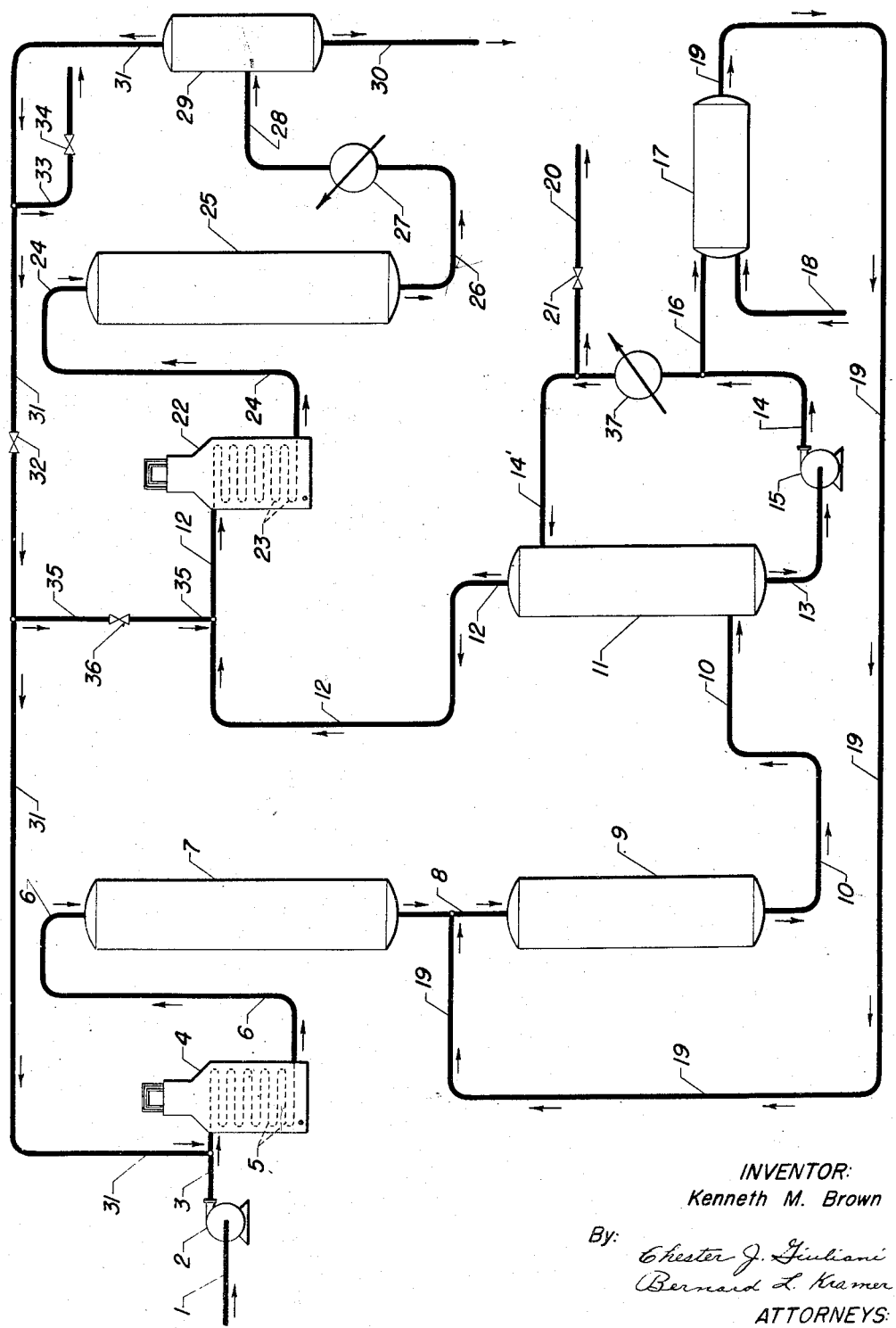
*INVENTOR:*
Kenneth M. Brown
By:
Chester J. Giuliani
Bernard L. Kramer
*ATTORNEYS*

United States Patent Office

2,697,064
Patented Dec. 14, 1954

2,697,064

DESULFURIZATION AND REFORMING OF HYDROCARBON FRACTIONS

Kenneth M. Brown, Hinsdale, Ill., assignor to Universal Oil Products Company, Des Plaines, Ill., a corporation of Delaware Application July 13, 1953, Serial No. 367,700

9 Claims. (Cl. 196—28)

This invention relates to the desulfurization and reforming of hydrocarbons and is particularly related to a combination process wherein a petroleum fraction is purified to remove sulfur therefrom and improved by reforming.

Petroleum fractions, particularly those boiling in the gasoline range, may be greatly improved by subjecting them to reforming. The petroleum fraction, which may be a saturated gasoline including straight run gasoline, etc., olefinic gasoline including cracked gasoline, etc. or a mixture thereof and particularly a mixture of straight run and cracked gasolines, may be reformed by contacting it with a suitable catalyst and particularly a catalyst containing platinum and more particularly a catalyst comprising platinum, alumina and combined halogen. The reforming treatment greatly improves the characteristics of the gasoline fraction as a motor fuel. Improvement is effected by isomerization of straight chain compounds to form more highly branched chain compounds, aromatization of naphthenic hydrocarbons to produce aromatic hydrocarbons, dehydrocyclization of straight chain or slightly branched chain hydrocarbons to produce aromatic hydrocarbons, selective cracking of higher boiling compounds to form lower boiling compounds and other reactions.

Although the reforming catalyst may be sulfur resistant, it has been found that high concentrations of sulfur in the feed stock or in the recycle gas, or more particularly the total amount of sulfur contacting the catalyst from both sources frequently causes a decrease in the activity of the catalyst. To avoid such a decrease in activity it is desirable to remove sulfur from the feed stock prior to contacting the catalyst.

Many methods have been devised for reducing or removing sulfur from the feed stock. Most of these methods consist of subjecting the feed stock to a mild hydrogenation and subsequent separation of hydrogen sulfide prior to passing the feed stock into contact with the reforming catalyst. Another method is to contact the feed with a material that reacts with sulfur and forms a stable sulfide prior to contacting the feed stock with the reforming catalyst. The first of these methods is the most satisfactory, however, it has some inherent difficulties, the most serious of which is that the hydrogenation of sulfur is effected at relatively high temperature and pressure and the hydrocarbon material must be cooled and the pressure released in order to separate the undesirable hydrogen sulfide from the total effluent from the treating zone by the usual methods such as fractionation, or absorption in dilute aqueous alkali. After the separation of hydrogen sulfide, the hydrocarbon material must again be heated to a high temperature and placed under a high pressure to be reformed. It may clearly be seen that this sequence of steps causes losses of energy and requires complicated equipment, that make the process costly and difficult to operate.

The second of the common processes, which consists of reacting the sulfur in feed stock with a sulfur stable substance, such as iron, is rarely used because it is inherently unsatisfactory due to the fact that the material used for removing sulfur is consumed and must be replaced periodically. In the operation of a refinery, large quantities of material are treated each day and the amount of sulfur stable reagent consumed is of such a magnitude as to make this means of purification unsuitable.

The process of the present invention provides a continuous means of desulfurizing a hydrocarbon feed stock and reforming the resultant desulfurized product in a manner that substantially eliminates the above mentioned difficulties.

It is an embodiment of the present invention to desulfurize and reform a hydrocarbon fraction by contacting the hydrocarbon fraction with a treating catalyst to effect the hydrogenation of the combined sulfur in the hydrocarbon fraction at hydrogenating conditions and in the presence of hydrogen, passing the effluent from the hydrogenating zone into an oxidizing zone wherein the effluent is treated with sulfur dioxide to produce a material comprising hydrocarbon and elemental sulfur due to the reaction between $H_2S$ and $SO_2$ which forms $H_2O$ and sulfur, passing the effluent from the oxidizing zone to a sulfur removing zone wherein the elemental sulfur is scrubbed from the stream by countercurrent contact with molten sulfur, passing the resultant sulfur free hydrocarbon stream into a reforming zone wherein it contacts a reforming catalyst at reforming conditions, passing a portion of the molten sulfur from the scrubbing zone to a burning zone wherein it is oxidized to produce sulfur dioxide which is utilized in the oxidizing zone, separating the effluent from the reforming zone into a gas phase and a liquid phase and passing at least a portion of the gas phase into the treating zone.

The treating zone in which the sulfur bearing molecules in the feed stock are hydrogenated preferably contains a catalyst which is a sulfur resistant material having hydrogenating activity. Sulfur resistant materials having hydrogenating activity include platinum, palladium, cobalt, molybdenum, etc., and compounds and/or mixtures thereof, and these preferably are composited with carrying material such as inorganic oxides including silica, alumina, magnesia, zirconia, mixtures thereof such as silica-alumina, silica-magnesia, silica-alumina-magnesia, etc., or any of the above promoted with acid acting substances such as halogens, phosphates, etc. The sulfur resistant hydrogenation catalyst may also be composited with naturally occurring substances such as bauxite, fullers earth, kieselguhr, clays, montmorillonite clay, etc. which may be activated by special treatment with acids, steam, etc. The preferred catalyst comprises sulfided cobalt oxide-molybdenum oxide composited with alumina, which may contain a small amount of promoting material such as a halogen or silica. A promoted catalyst is preferred since the promoter aids in severing carbon-sulfur and carbon-nitrogen bonds.

The treating zone may be operated at temperatures of from about 300° F. to about 800° F. and pressures of from atmospheric to 2000 p. s. i. or more and is preferably operated at a temperature of from about 500° F. to about 750° F. and a pressure of from about 100 p. s. i. to about 800 p. s. i. The operating conditions in the treating zone are selected to perform the desired reduction in sulfur content and the particular conditions to be used in a particular operation will depend upon the amount of sulfur, the type of molecule in which the sulfur is contained, the purity of the hydrogen gas, etc.

The oxidizing zone wherein the reaction between hydrogen sulfide and sulfur dioxide to form elemental sulfur is effected will preferably contain a catalytic material which may include activated bauxite, fullers earth, alumina, or a carrying material such as alumina, silica, etc. composited with a suitable oxidation catalyst such as platinum, vanadium, etc. The reaction between sulfur dioxide and hydrogen sulfide is preferably effected at a temperature of from about 400° F. to about 800° F. and a pressure of from about 100 to about 200 p. s. i. or more, the preferred range of temperature being from about 450° F. to about 650° F. and a pressure substantially the same as that used in the previous zone. The choice of catalyst and operating conditions in the oxidation zone will depend largely upon the conditions of temperature and pressure of the effluent from the preceding zone.

The effluent from the oxidizing zone is passed into the lower section of the sulfur removal zone. At the temperature and pressure of the sulfur removal zone, the hydrocarbon portion of the stream will generally but not necessarily, be gaseous and its countercurrent contact with molten sulfur entering the upper portion of the sulfur removal zone will result in the removal of the sulfur, formed in the previous oxidation zone, from the hydrocarbon stream. A portion of the sulfur removed will be passed to a burning zone wherein sulfur dioxide is formed, another portion will be recirculated to the upper portion of the sulfur removal zone to effect the further removal of sulfur from the hydrocarbon stream and another portion may be removed as sulfur product. The sulfur removal zone will preferably contain some means of effecting intimate contact between the hydrocarbon stream and the liquid sulfur stream, such as packing, perforated decks, bubble cap plates, etc.

The effluent from the sulfur removal zone which passes from the upper portion of the sulfur removal zone, consists substantially of hydrocarbons. This hydrocarbon stream may be heated if necessary, and passed into contact with reforming catalyst at a temperature of from about 600° F. to about 1000° F. and a pressure of from about 100 p. s. i. to 1000 p. s. i. or more, and in the presence of the hydrogen. The resulting reformate is cooled and passed into a separation zone wherein the liquid product is withdrawn and the resulting gases are recycled, at least in part, to the initial treating zone to be further used in the process.

The reforming reactions are preferably effected in the presence of a catalyst which may comprise a metal such as platinum, palladium, nickel, cobalt, etc. preferably in extended surface condition, as when composited with a suitable carrier such as alumina, silica, magnesia, zirconia, etc., mixtures thereof such as silica-alumina, silica-magnesia, silica-alumina-zirconia, etc. The composite may also be promoted with an acidic substance such as halogen, phosphate, etc. A particularly suitable reforming catalyst, and the preferred catalyst of this invention, is the well known Platforming catalyst which is a composite of alumina, platinum in an amount of from about 0.01% to about 1.0% by weight and combined halogen in an amount of from about 0.1 to about 8.0% by weight.

The process of the present invention has many advantages over those previously used for effecting the desulfurization of gasoline. One advantage is that no sulfur comes in contact with the reforming catalyst in the process of the present invention which is an improvement over processes wherein the sulfur in contact with the catalyst is controlled by removing hydrogen sulfide from the recycle gas. The sulfur is hydrogenated in the treating zone and removed in the oxidation and sulfur removal zones so that a substantially sulfur-free feed stock contacts the reforming catalyst.

Another advantage of the present process is that the temperature of the stream is never reduced. The incoming charge stock is heated to a temperature at which the sulfur hydrogenation reactions may be effected, after which it is not necessary to reduce the temperature and pressure of the stream but to merely pass the stream into the next stage, which is the oxidation zone. This is a great advantage over existing processes because, in order to effectively separate hydrogen sulfide from a hydrocarbon stream in the prior processes, it is necessary at least to bring the temperature below the critical temperature of the hydrocarbon material and preferred to reduce the pressure to obtain a greater boiling point difference between components. Although heat exchange schemes may be established so that losses in heat energy are minimized, there is no practical method of minimizing the loss in compressor capacity. Since it is preferable to fractionate at as low a pressure as possible in order to have the greatest difference in boiling point between the substances to be separated, the separation of hydrogen sulfide from the stream of charge stock will generally be at conditions which compromise good separation with economical operation.

Other advantages are that pure hydrogen can be made by the process of the present invention which may find other uses and pure sulfur may be made which may be sold as a by-product. A corollary advantage to the manufacture of pure sulfur is that the sulfur from the charge stock may be disposed of readily at a profit as a solid material whereas it must otherwise be disposed of as a noxious gaseous material which contaminates the atmosphere in the vicinity of the refinery, frequently to the extent of requiring special equipment for eliminating this nuisance.

The accompanying drawing is presented to further illustrate the process of the present invention but is not intended to unduly limit this invention to the particular process or materials described.

Referring now to the drawing, charge stock, which is preferably a petroleum fraction boiling within the gasoline range, passes through line 1, pump 2 and line 3 wherein it is commingled with a hydrogen-containing gas from line 31, into heater 4, wherein the material passing through coil 5 is heated to the desired temperature. The effluent from coil 5 passes through line 6 into the upper portion of treating reactor 7. In treating reactor 7 the combined stream of charge stock and hydrogen-containing gas contacts a treating catalyst which is preferably a composite of sulfided cobalt oxide-molybdenum oxide composited with alumina. The material in treating reactor 7 is maintained at a temperature of from about 300° F. to about 800° F. and preferably from 500° F. to 750° F. and a pressure of from about 100 p. s. i. to about 2000 p. s. i. and preferably from about 100 p. s. i. to about 800 p. s. i., for a time regulated to effect the desired desulfurization. The effluent from treating reactor 7, which comprises hydrocarbons of substantially the same boiling range as the charge stock and hydrogen sulfide as well as hydrogen and a minor portion of light hydrocarbons, passes from the lower portion of treating reactor 7 through line 8 wherein the stream is commingled with sulfur dioxide entering line 8 through line 19. The commingled stream of treating reactor effluent and sulfur dioxide passes into oxidizing reactor 9, wherein it is contacted with oxidizing catalyst, preferably activated alumina, at a temperature of from about 400° F. to about 800° F. and at a pressure that is substantially the same as that of the previous treating reactor 7. The effluent from oxidizing reactor 9 which comprises hydrocarbons, water and elemental sulfur passes from the lower portion of oxidizing reactor 9 through line 10 and into the lower portion of sulfur removal zone 11. In sulfur removal zone 11 the hydrocarbons rise and are countercurrently contacted with a descending stream of molten sulfur which removes the elemental sulfur, formed in oxidizing reactor 9, from the stream. A resulting substantially sulfur-free stream of hydrocarbon and hydrogen passes from the upper portion of sulfur removal zone 11 through line 12 into heater 22. A molten sulfur stream passes from the lower portion of sulfur removal zone 11 through line 13 and pump 15 which discharges into line 14. Line 14 passes through cooler 37 through line 14' into the upper portion of sulfur removal zone 11 to form the countercurrent stream of molten sulfur. Line 16 withdraws a portion of the molten sulfur stream from line 14 and passes into burning zone 17 wherein it is oxidized to form sulfur dioxide by combining with oxygen-containing gas which is preferably air, entering burning zone 17 through line 18. The resultant sulfur dioxide-containing gas passes from burning zone 17 through line 19 into the before mentioned line 8 wherein it commingles with the effluent stream from treating zone 7. Line 20 and valve 21 are provided to remove excess sulfur from the system.

The hereinbefore described material passing from the upper portion of sulfur removal zone 11 through line 12 is heated in coil 23 contained in heating zone 22 and passes therefrom through line 24 into the upper portion of reforming reactor 25. In reforming reactor 25, the hereinbefore described reforming reactions are effected, and the resultant reformer effluent passes from the lower portion of reforming zone 25 through line 26 into cooler 27, wherein the effluent is cooled and partially condensed to form two phases. The effluent from cooler 27 passes through line 28 into receiver 29 wherein the two phases separate, the liquid phase being withdrawn from the lower portion of receiver 29 through line 30 as reformate product, while the hydrogen-containing gaseous phase passes from the upper portion of receiver 29 through the before mentioned line 31 and valve 32, commingling with the stream of incoming charge stock in line 3. Line 33 containing valve 34 is provided to vent excess gas from the process and thereby maintain the desired pressure in the reforming zone. Line 35 containing valve 36 is provided to recycle a portion of the hydrogen-containing gas in line 31 directly back to reforming zone 25 if desired.

It is understood that many modifications of the above described flow may be made without removing the modified flow from the broad scope of this invention. Some such modifications may include passing the hydrocarbon stream in an upflow manner through the treating reactor, the oxidation reactor, and the reforming reactor, the use of a series of reactors in the reforming reaction, the use of inter heaters or coolers between the various reaction zones, the use of valves and pumps where it is consistent with the pressure levels maintained at various portions of the plant, the use of instruments and valves to control the rates of flow, pressures, temperatures, etc., at various points in the plant and others.

I claim as my invention:

1. A combination desulfurizing and reforming process which comprises subjecting a sulfur-containing hydrocarbon fraction to desulfurization treatment in the presence of hydrogen and a desulfurizing catalyst, commingling at least a portion of the effluent from the treating zone with sulfur dioxide, contacting the resultant mixture with an oxidizing catalyst at oxidation conditions, separating the effluent from the oxidation zone into a substantially sulfur free hydrocarbon fraction and an elemental sulfur fraction, burning at least a portion of said elemental sulfur fraction to produce sulfur dioxide to be used in said oxidation zone, subjecting said substantially sulfur free hydrocarbon fraction to reforming in the presence of a reforming catalyst, separating the reforming zone effluent into a liquid phase and a gas phase, and supplying at least a portion of said gas phase to said treating zone as hydrogen for use therein.

2. The process of claim 1 further characterized in that said hydrogenating catalyst comprises a sulfided composite of cobalt oxide-molybdenum oxide and alumina.

3. The process of claim 1 further characterized in that said oxidizing catalyst comprises alumina.

4. The process of claim 1 further characterized in that said reforming catalyst comprises platinum, alumina, and combined halogen.

5. The process of claim 1 further characterized in that said desulfurization treatment is effected at a temperature of from about 300° F. to about 800° F. and a pressure of from about 100 p. s. i. to about 2000 p. s. i.

6. The process of claim 1 further characterized in that said oxidation is effected at a temperature of from about 400° F. to about 800° F. and at a pressure of from atmospheric to about 2000 p. s. i.

7. The process of claim 1 further characterized in that said reforming is effected at a temperature of from about 600° F. to about 1000° F. and at a pressure of from about 100 p. s. i. to about 1000 p. s. i.

8. The process of claim 1 further characterized in that said elemental sulfur is removed from said oxidation zone effluent by countercurrently contacting said effluent with molten sulfur.

9. The process of reforming and desulfurizing a sulfur-containing hydrocarbon fraction which comprises treating said hydrocarbon fraction with a catalyst comprising a sulfided composite of cobalt oxide-molybdenum oxide and alumina at a temperature of from about 300° F. to about 800° F. at a pressure of from about 100 p. s. i. to about 2000 p. s. i. in the presence of hydrogen, commingling the effluent from the treating zone with sulfur dioxide, contacting the resultant mixture with a catalyst comprising activated alumina at a temperature of from about 400° F. to about 800° F. and a pressure of from atmospheric to about 1000 p. s. i. countercurrently contacting the resultant elemental sulfur and hydrocarbon-containing stream with a stream of molten sulfur to produce a substantially sulfur free hydrocarbon and hydrogen stream and a sulfur stream, burning at least a portion of said sulfur to produce sulfur dioxide for use in said oxidizing zone, passing another portion of said sulfur into countercurrent contact with said oxidation zone effluent, passing said sulfur free hydrocarbon fraction into contact with a reforming catalyst comprising platinum, alumina and combined halogen at a temperature of from about 600° F. to about 1000° F. and a pressure of from about 100 p. s. i. to about 1000 p. s. i., cooling the effluent from said reforming zone to form a gas phase and a liquid phase and passing said gas phase into said treating zone to supply said hydrogen thereto.

References Cited in the file of this patent

UNITED STATES PATENTS

| Number | Name | Date |
| --- | --- | --- |
| 2,169,261 | Lee et al. | Aug. 15, 1939 |
| 2,417,308 | Lee | Mar. 11, 1947 |
| 2,619,407 | Udy | Nov. 25, 1952 |
| 2,642,283 | Berger | June 16, 1953 |